(12) United States Patent
Reinking

(10) Patent No.: US 7,151,145 B1
(45) Date of Patent: Dec. 19, 2006

(54) PROCESS FOR NARROWING SHORT-CHAIN BRANCHING DISTRIBUTION IN TWO-STEP ETHYLENE POLYMERIZATIONS AND PRODUCTS

(75) Inventor: Mark K. Reinking, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 11/180,853

(22) Filed: Jul. 13, 2005

(51) Int. Cl.
 *C08F 4/42* (2006.01)
(52) U.S. Cl. .............................. 526/124.3; 526/124.1; 526/124.2; 526/128; 526/348; 526/352; 502/103; 502/116
(58) Field of Classification Search ............. 526/124.1, 526/124.2, 124.3, 128, 348, 352; 502/103, 502/116
 See application file for complete search history.

(56) References Cited

U.S. PATENT DOCUMENTS 4,357,448 A * 11/1982 Tsubaki et al. ............... 526/65
5,731,392 A    3/1998 Ali et al.
6,171,993 B1 * 1/2001 Mavridis et al. ............ 502/103
6,642,326 B1   11/2003 Meyer et al.

FOREIGN PATENT DOCUMENTS

WO    WO 2005/005489 A1    1/2005

OTHER PUBLICATIONS

Yau, Wallace, W., et al.: "New Approaches Suing MW-Sensitive Detectors in GCP-TREF for Polyolefin Characterization" *Polymer 42* (2001) 8947-8958.

* cited by examiner

*Primary Examiner*—Ling-Sui Choi
(74) *Attorney, Agent, or Firm*—Gerald A. Baracka; William A. Heidrich

(57) ABSTRACT

An improved two-step polymerization process wherein ethylene homopolymer is produced in a first reactor and ethylene copolymer having narrowed short-chain branching distribution is prepared in a second reactor. Narrowed short-chain branching distribution of the copolymer is achieved by including specific silane modifiers in the second reactor.

8 Claims, No Drawings

PROCESS FOR NARROWING SHORT-CHAIN BRANCHING DISTRIBUTION IN TWO-STEP ETHYLENE POLYMERIZATIONS AND PRODUCTS

BACKGROUND OF THE INVENTION

1. Field of the Invention

The present invention relates to an improved process wherein high melt index ethylene homopolymer and low melt index ethylene copolymer having a narrowed short-chain branching distribution are prepared in separate polymerization zones to provide polyethylene resins having improved physical characteristics. Specific alkoxysilane modifiers are introduced into the copolymerization reactor to effect the desired modification of short-chain branching distribution.

2. Description of Prior Art

Two-step processes for polymerizing ethylene using a Ziegler-type catalyst dispersed in an inert hydrocarbon medium such as hexane or heptane are known. U.S. Pat. No. 4,357,448 describes such a process wherein polyethylene produced in a first polymerization zone is fed into a second polymerization zone together with the catalyst, solvent and unreacted ethylene. Additional ethylene and a comonomer are added to the second polymerization reactor and the final product is recovered. The polymerizations are carried out at relatively low temperatures and pressures using catalysts having high catalytic activity comprising an organoaluminum compound and a specific solid catalytic component obtained by reacting a titanium or vanadium halogen-containing compound with a reaction product obtained by reacting a Grignard reagent with a hydropolysiloxane of the formula

where R represents an alkyl, aryl, aralkyl, alkoxy, or aryloxy group, a is 0, 1 or 2; b is 1, 2 or 3; and a+b is $\leq 3$ or a silicon compound containing an organic group and hydroxyl group in the presence or absence of an aluminum-alkoxide, aluminum alkoxy-halide or a reaction product obtained by reacting the aluminum compound with water.

Resins produced by these processes have good processability and extrudability making them highly useful for the manufacture of film, blow molded articles, pipe, etc.

The ability to control the molecular weight distribution of the final resin product in such processes using hydrogen as a molecular weight regulator and varying the ratio of the polymer produced in the first step to the polymer produced in the second step is highly advantageous and provides manufacturing versatility. It would be even more advantageous if in two-step processes of the above types where ethylene homopolymer is produced in the first step and ethylene copolymer is produced in the second step if the short-chain branching distribution of the copolymer produced in the second step could be narrowed. By narrowing the short-chain branching distribution resins having characteristics more closely resembling those of metallocene resins could be produced.

Various silane compounds have been utilized for the preparation of transition metal catalysts. U.S. Pat. No. 6,171,993, for example, discloses reacting various hydrocarbyl alkoxysilanes with the contact product of an organomagnesium compound and chemically treated support prior to contacting with the transition metal compound. Catalysts prepared in the above manner are combined with conventional aluminum-containing cocatalysts for the copolymerization of ethylene and hexene-1 or butene-1 in either gas phase or solution phase processes.

Various organosilicon compounds are also employed with Ziegler-Natta catalysts as selectivity control agents, primarily for the polymerization of propylene and ethylene to modify isotacticity. These processes are discussed in detail in PCT International Publication No. WO 2005/005489 A1. The process disclosed utilizes a specific mixture, preferably comprised of three silane compounds, for the polymerization of propylene or mixtures of propylene and ethylene.

U.S. Pat. No. 6,642,326 discloses the use of hydrosilane and polysiloxyhydrosilane modifiers to enhance the activity of boraaryl single-site catalysts.

The addition of tetraalkylorthosilicates to gas phase fluidized bed olefin polymerization reactors is disclosed in U.S. Pat. No. 5,731,392 to control static and thus reduce buildup of polymeric material on the reactor walls.

SUMMARY

The present invention provides an improved two-step process for the production of polyethylene resins having narrowed short-chain branching distribution. In the two-step polymerization process ethylene homopolymer is produced in a first reactor and ethylene copolymer having narrowed short-chain branching distribution is prepared in a second reactor. Specific alkoxysilane modifiers, namely, monoalkyltrialkoxysilanes, are included in the copolymerization stage of the two-step process to narrow the short-chain branching distribution of the copolymer resin.

More specifically, the invention is an improved two-step process wherein ethylene homopolymer is produced in a first polymerization and ethylene-α-olefin copolymer is produced in a second polymerization reactor, said polymerizations conducted in an inert hydrocarbon medium using a solid high activity transition metal-containing catalyst and organoaluminum co-cocatalyst, and said homopolymer and copolymer are combined to obtain a final polyethylene resin product. The improvement comprises conducting the copolymerization in the second polymerization reactor in the presence of from 1 to 100 ppm, based on the inert hydrocarbon, monoalkyltrialkoxysilane of the formula

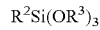

where $R^2$ is a $C_{1-10}$ alkyl group and $R^3$ is a $C_{1-5}$ alkyl group while maintaining reactor conditions and feed rates to produce copolymer having a density of 0.940 g/cm³ or less.

In an especially useful aspect of the invention, the monoalkyltrialkoxysilane is methyltriethoxysilane. The silane modifier may be added to the first reactor and transferred to the second reactor with the homopolymer product formed in the first reactor or, as is more usually the case, the silane modifier will only be present in the second reactor.

Polyethylene resins produced by the improved process of the invention will have densities in the range 0.930 to 0.975 g/cm³ and melt indexes in the range 0.001 to 80 g/10 min. The copolymer component of the product is preferably an ethylene-butene-1, ethylene-hexene-1 or ethylene-octene-1 copolymer having a melt index from 0.001 to 10 g/10 min, density from 0.915 to 0.940 g/cm³ and containing 90 percent or more low short-chain branched material. The amount of copolymer in the final polyethylene resin product ranges from 35 to 65 weight percent. Particularly useful polyethylene resins produced by the process have densities from 0.930 to 0.954 g/cm³ and melt indexes from 0.01 to 2.5 g/10 min.

DETAILED DESCRIPTION

The present process whereby improved polyethylene resins comprised of homopolymer and copolymer constituents and having narrowed short-chain branching distribution is a two-step process wherein specific alkoxysilane modifiers are present in the copolymerization stage.

The process comprises producing ethylene homopolymer resin in a first polymerization zone and ethylene-α-olefin copolymer resin in a second polymerization zone and combining said resins in the desired ratio to obtain a final polyethylene resin product. The polymerizations are preferably conducted as slurry processes in an inert hydrocarbon medium in separate reactors which may be connected in a parallel or series manner. Most typically, the reactors are connected in series in which case the homopolymer produced in the first reactor is fed into the second reactor with the catalyst, solvent and unreacted ethylene where comonomer and additional ethylene are added. Such two-stage processes are known and described in U.S. Pat. No. 4,357, 448 details of which are incorporated herein by reference. Whereas slurry polymerizations are the preferred mode of operation, gas-phase polymerizations and polymerizations conducted in supercritical media are also possible.

It has now unexpectedly been discovered that when specific types of silane modifiers, namely monoalkyltrialkoxysilanes, are included in the second copolymerization stage that it is possible to significantly narrow the short-chain branching (SCB) distribution of the copolymer produced therein. This ability to modify SCB distribution provides resin manufacturers with yet another means of producing resins having specific targeted properties using this already very versatile process.

As used herein, the terms first reactor or first reaction zone refer to the step where ethylene homopolymer is produced and the terms second reactor or second reaction zone refer to the step where ethylene is copolymerized with one or more a-olefin comonomers. This terminology is applied even where the reactors are connected in parallel mode. It will be understood by those skilled in the art that whereas the product formed in the first reactor is predominantly homopolymer, small amounts of copolymer may also be formed in the first reactor under certain operating conditions. This can occur, for example, in commercial operations where recycle gases which can contain small amounts of comonomer are employed and fed to the first reactor.

The polymerizations are carried out in an inert hydrocarbon medium using conventional Ziegler-type catalysts. Typically, the same catalyst is used for both polymerizations; however, this is not necessary particularly when the polymerizations are conducted in parallel. When conducted in series, it may be desirable to add additional catalyst to the second reactor and this catalyst may be the same or different than the catalyst employed in the first reactor.

Inert hydrocarbons which can be used for the process include saturated aliphatic hydrocarbons such as hexane, isohexane, heptane, isobutane and mixtures thereof. Catalysts are typically metered into the reactors dispersed in the same hydrocarbon used as the polymerization medium.

Polymerizations in the first and second reactors are carried out at pressures up to 300 psi and temperatures up to 100° C. Polymerization temperatures are most typically maintained at 60° C. to 95° C. and, more preferably, between 65° C. and 85° C. Pressures are most generally between 80 psi and 200 psi and, more preferably, from 80 psi to 160 psi when using hexane(s) as the polymerization medium. Hydrogen may be included in either or both of the reactors to regulate molecular weight.

Properties of the final polyethylene resin product will vary depending on the properties of the individual homopolymer and copolymer products produced in the respective reactors and the ratio of homopolymer and copolymer resin components. The final polyethylene resin will, however, generally have a density of 0.925 g/cm³ or above and melt index (MI) less than 100 g/10 min. Densities of the polyethylene resins produced by the process are preferably in the range 0.930 to 0.975 g/cm³ and MIs are preferably in the range 0.001 to 80 g/10 min. Especially useful polyethylene resin products for film, blow molding and extrusion applications have densities from 0.930 to 0.954 g/cm³ and MIs from 0.01 to 2.5 g/10 min. Densities and MIs referred to herein are determined in accordance with ASTM D 1505 and ASTM D 1238-01, condition 190/2.16, respectively. The copolymer will typically constitute from 35 to 65 wt. % and, more preferably, from 45 to 55 wt. % of the final polyethylene resin product.

In the usual practice of the process, higher density, higher MI polymer, predominantly ethylene homopolymer, is produced in the first reactor and lower density, lower MI ethylene/butene-1, ethylene/hexene-1 or ethylene/octene-1 copolymer is produced in the second reactor. To accomplish this, hydrogen to ethylene mole ratios from 1 to 10 are employed in the first reactor whereas hydrogen to ethylene mole ratios from 0.01 to 1 are employed in the second reactor. When operating in series mode, it may be necessary to vent hydrogen prior to transferring the homopolymer in order to achieve the desired hydrogen:ethylene ratio in the second reactor. This can be readily accomplished by means of a flash tank installed between the two reactors.

MI and density of polymer produced in the first reactor will be in the range 1 to 1000 g/10 min and 0.955 to 0.975 g/cm³, respectively, whereas MI and density of copolymer produced in the second reactor will be in the range 0.001 to 10 g/10 min and 0.915 to 0.940 g/cm³, respectively. In a particularly advantageous embodiment of the invention the copolymer produced in the second reactor will have a density of 0.925 to 0.938 g/cm³ and MI from 0.01 to 5 g/10 min.

High activity catalyst systems employed for the polymerizations comprise a solid transition metal-containing catalyst component and organoaluminum co-catalyst component.

The solid transition metal-containing catalyst component is obtained by reacting a titanium or vanadium halogen-containing compound with a reaction product obtained by reacting a Grignard reagent with a hydropolysiloxane having the formula

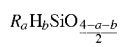

wherein R represents an alkyl, aryl, aralkyl, alkoxy, or aryloxy group as a monovalent organic group; a is 0, 1 or 2; b is 1, 2 or 3; and a+b≦3) or a silicon compound containing an organic group and hydroxyl group in the presence or absence of an aluminum-alkoxide, aluminum alkoxy-halide halide or a reaction product obtained by reacting the aluminum compound with water.

Organoaluminum co-catalysts correspond to the general formula

wherein $R^1$ is a $C_1$–$C_8$ hydrocarbon group; X is a halogen or an alkoxy group; and n is 1, 2 or 3. Useful organoaluminum compounds of the above type include triethylaluminum, tributylaluminum, diethylaluminum chloride, dibutylaluminum chloride, ethylaluminum sesquichloride, diethylaluminum hydride, diethylaluminum ethoxide and the like.

High activity catalyst systems of the above types useful for the improved process of the invention are known and are described in detail in U.S. Pat. No. 4,357,448, the contents of which are incorporated herein by reference.

An essential feature of the present improved process which makes it possible to produce copolymers having narrowed SCB distribution is the utilization of specific alkoxysilane modifiers in the second reactor. It has unexpectedly been observed that, when producing copolymers having densities of 0.940 g/cm³ or below in the second reactor, by including a monoalkyltrialkoxysilane in the copolymerization reactor with the ethylene monomer, comonomer, catalyst, cocatalyst, inert hydrocarbon and, optionally, ethylene homopolymer and/or hydrogen, it is possible to significantly narrow the SCB distribution of the copolymer. More specifically, by utilizing the monoalkyltrialkoxysilane modifiers in the second stage of the process it is possible to produce copolymers wherein the weight percentage of low SCB material is 90 percent or greater.

Narrowed SCB distribution typically results in improved resin properties, such as improved impact and/or improved environmental stress crack resistance. The monoalkyltrialkoxysilane compound is preferably diluted in a hydrocarbon and added to the second reactor; however, in series operation it may be added to the first reactor and transferred to the second reactor with the homopolymer, unreacted ethylene, catalyst and inert hydrocarbon. The addition of the silane modifier to the first reactor has little or no affect on the homopolymer.

Monoalkyltrialkoxysilane compounds suitable for use in the improved process of the invention correspond to the general formula

where $R^2$ is a $C_{1-10}$ alkyl group and $R^3$ is a $C_{1-5}$ alkyl group. Methyltriethoxysilane (MTEOS) is particularly advantageous. The amount of silane modifier present in the second reactor can range from 1 to 100 ppm, based on the inert hydrocarbon and, more preferably, will be in the range 10 to 50 ppm.

Short-chain branching is determined using a temperature rising elution fractionation (TREF) technique as described by Yau and Gillespie in their article entitled "New Approaches Using MW-Sensitive Detectors in GPC-TREF for Polyolefin Characterization" (Polymer 42 (2001) 8947-8958). The procedure utilizes a crystallization and redissolution process to separate polymers having different SCB contents. More specifically, the polymer is dissolved in a suitable solvent and injected onto a packed column which is slowly cooled. During the cooling, polymer fractions having different levels of SCB precipitate and coat the packing particles in layers with the most highly branched fraction precipitating out last to form the outermost layer in the column. The column is then subjected to controlled heating and elution where, as the temperature increases with time, the more highly branched molecules elute first followed by molecules having decreasing levels of SCB. By utilizing suitable detection means, typically an infrared detector, the polymer concentration over the elution temperature range can be plotted to provide an SCB distribution curve, i.e., TREF curve.

The breadth of the TREF curve provides an indication of the SCB distribution. At the same polymer density, a narrower TREF curve indicates a narrower SCB distribution, i.e., the polymer chains have more similar amounts of short-chain branching.

The ability to narrow the SCB distribution of copolymer produced in the second reactor, and accordingly, the SCB distribution of the overall resin product, is demonstrated by the following examples where ethylene and butene-1 were copolymerized in accordance with the process of the invention and the SCB distribution of the resulting copolymer determined. The examples are provided to illustrate the invention more fully; however, those skilled in the art will recognize variations that are within the spirit of the invention and scope of the claims.

The catalyst employed for all of the copolymerizations reported in the examples was a solid transition metal(Ti)-containing catalyst prepared in accordance with Example 1(a) and (b) of U.S. Pat. No. 4,357,448.

To demonstrate the unexpected and significant narrowing of the SCB distribution for copolymers prepared in the second stage of the two-step process in accordance with the invention, ethylene and butene-1 were copolymerized utilizing the above-identified high activity Ti catalyst in the presence of MTEOS modifier. For the copolymerization, a catalyst slurry (0.00015 moles Ti per liter hexane) was prepared and continuously fed to the reactor at a rate of 20 pounds per hour (pph) while also feeding ethylene (26 pph), butene-1 (3.52 pph), hexane (118.5 pph), and 0.24 gallons per hour (gph) of a hexane solution containing 1 wt. % triethylaluminum cocatalyst. A hexane solution containing 800 ppmw MTEOS was fed at a rate to maintain 12 ppm MTEOS in the reactor based on the total weight of hexane. Hydrogen was also fed to the reactor so that a molar ratio of hydrogen to ethylene of about 0.29 was maintained in the vapor space. Reactor pressure and temperature were maintained at about 82 psig and 74° C., respectively. The above conditions were selected to produce a copolymer having an MI of about 0.1 g/10 min and density less than 0.940 g/cm³.

The ethylene-butene-1 copolymer recovered had an MI of 0.11 g/10 min, density of 0.933 g/cm³ and significantly narrowed SCB distribution compared to copolymer identically produced without the addition of the MTEOS modifier. Narrowed SCB distribution was verified by comparing the weight percent of copolymer eluted over three different temperature zones of the TREF curve. These three temperature zones (below 40° C.; 40° C. to 85° C.; and 85° C. to 110° C.) respectively correspond to the temperature ranges where high SCB copolymer, medium SCB copolymer and low SCB copolymer are eluted. For the purpose of this invention high SCB copolymer is defined as copolymer molecules having more than 50 branches per 1000 total carbon atoms; medium SCB copolymer is defined as copolymer molecules having 10 to 50 branches per 1000 total carbon atoms; and low SCB copolymer is defined as copolymer molecules having less than 10 branches per 1000 total carbon atoms.

The ethylene-butene-1 copolymer prepared in accordance with the invention using the MTEOS modifier contained no high SCB copolymer and only 4% medium SCB copolymer. Ninety-six (96)% of the copolymer was low SCB material. On the other hand, copolymer prepared without the addition of MTEOS to the reactor contained only 82% low SCB material. The remaining 18% was medium SCB material. The above data clearly demonstrates the significant narrowing of SCB distribution achieved with the improved process of the invention.

To demonstrate the unexpected nature of these results, the copolymerization was repeated using another widely used alkoxysilane compound—one which is not a monoalkyltrialkoxysilane. The silane compound used for this comparative example was cyclohexylmethyldimethoxysilane (CHMDS). The copolymerization was conducted using the same conditions and feed rates. Ethylene-butene-1 copolymer produced using the CHMDS modifier had a significantly broader SCB distribution. While the comparative copolymer contained no high SCB copolymer, medium SCB copolymer comprised 12% of the product and the amount of the low SCB material was only 88%.

The ability to narrow SCB distribution of copolymer produced in the second stage reactor is even more unexpected considering that MTEOS and other commonly used silanes all produce similar results when producing higher density copolymers. To demonstrate this, copolymerizations were conducted in accordance with the above-described procedure except that copolymers having MIs greater than 1 g/10 min and densities above 0.942 g/cm³ were targeted. Silane compounds used included MTEOS, CHMDS, dimethyl dimethoxysilane (DMDS) and disecbutyl dimethoxysilane (DSBS). Feed rates and conditions used were as follows:

|  | MTEOS | CHMDS | DMDS | DSBS |
|---|---|---|---|---|
| Pressure (psig) | 122 | 107 | 105 | 91.6 |
| Catalyst (pph) | 28.03 | 22.87 | 30.74 | 17.35 |
| Ethylene (pph) | 29.1 | 30.0 | 30.0 | 27.6 |
| Butene-1 (pph) | 3.69 | 3.81 | 3.00 | 3.10 |
| Hexane (pph) | 170.5 | 178.6 | 170.7 | 183.8 |
| Cocatalyst (gph) | 0.32 | 0.30 | 0.33 | 0.30 |
| Silane modifier (pph) | 0.47 | 0.57 | 0.52 | 0.54 |
| Hydrogen:ethylene molar ratio | 0.69 | 0.62 | 0.77 | 0.61 |

MIs of all of the copolymers produced were approximately 2 g/10 min and densities were all approximately 0.943 g/cm³.

No high SCB copolymer was produced using any of the silane compounds. Weight percentages of low and medium SCB copolymer produced using each of the silanes were as follows:

| MTEOS | 9% medium/91% low |
| CHMDS | 9% medium/91% low |
| DMDS | 10% medium/90% low |
| DSBS | 10% medium/90% low |

It is apparent from the above data that when higher density/higher MI copolymers are targeted in the copolymerization reactor all of the silanes tested give similar SCB distributions and none of the silanes, even MTEOS, provided the narrow SCB distribution achieved when producing lower density copolymer in accordance with the process of the invention.

Similar narrowing of SCB distribution is achieved when PE homopolymer is present in the copolymerization reactor as would be the case in a two-stage continuous operation where the reactors are connected in series and wherein homopolymer is produced in a first reactor and fed to a second reactor where copolymer is produced. To mimic this type of operation, such as would typically be practiced on a commercial basis, a polyethylene homopolymer powder having an MI of about 200 g/10 min and density of about 0.971 g/cm³ is continuously fed into the copolymerization reactor at a rate of about 30 pph along with the catalyst, cocatalyst, hexane, ethylene, butene-1, MTEOS and hydrogen at the rates specified in the first example. Essentially the same level of narrowing of SCB distribution is achieved in this mode of operation.

I claim:

1. In a two-step process wherein ethylene homopolymer is produced in a first polymerization reactor and ethylene-α-olefin copolymer is produced in a second polymerization reactor, said polymerizations conducted in an inert hydrocarbon medium using a solid high activity transition metal-containing catalyst and organoaluminum co-cocatalyst, and said homopolymer and copolymer are combined to obtain a final polyethylene resin product, to narrow the short-chain branching distribution of the ethylene-α-olefin copolymer, the improvement comprising conducting the copolymerization in the second polymerization reactor in the presence of from 1 to 100 ppm, based on the inert hydrocarbon medium, monoalkyltrialkoxysilane of the formula $$R^2Si(OR^3)_3$$

where $R^2$ is a $C_{1-10}$ alkyl group and $R^3$ is a $C_{1-5}$ alkyl group while maintaining reactor conditions and feed rates to produce copolymer having a density of 0.940 g/cm³ or less and containing 90 percent or more low short-chain branched copolymer having fewer than 10 branches per 1000 carbon atoms.

2. The process of claim 1 wherein reactor conditions and feed rates in the second polymerization reactor are maintained to produce copolymer having a density from 0.915 to 0.940 g/cm³ and melt index from 0.001 to 10 g/10 min.

3. The process of claim 2 wherein the α-olefin comonomer copolymerized with ethylene in the second polymerization reactor is butene-1, hexene-1 or octene-1.

4. The process of claim 2 wherein the monoalkyltrialkoxysilane is methyltriethoxysilane.

5. The process of claim 4 wherein the monoalkyltrialkoxysilane is present in an amount from 10 to 50 ppm based on the inert hydrocarbon medium.

6. The process of claim 5 wherein the inert hydrocarbon medium is hexane.

7. The process of claim 2 wherein the first and second polymerization reactors are connected in series and the monoalkyltrialkoxysilane is added to the first polymerization reactor and transferred to the second polymerization reactor with ethylene homopolymer produced in said first polymerization reactor.

8. The process of claim 2 wherein the monoalkyltrialkoxysilane is added directly to the second polymerization reactor.

* * * * *